UNITED STATES PATENT OFFICE.

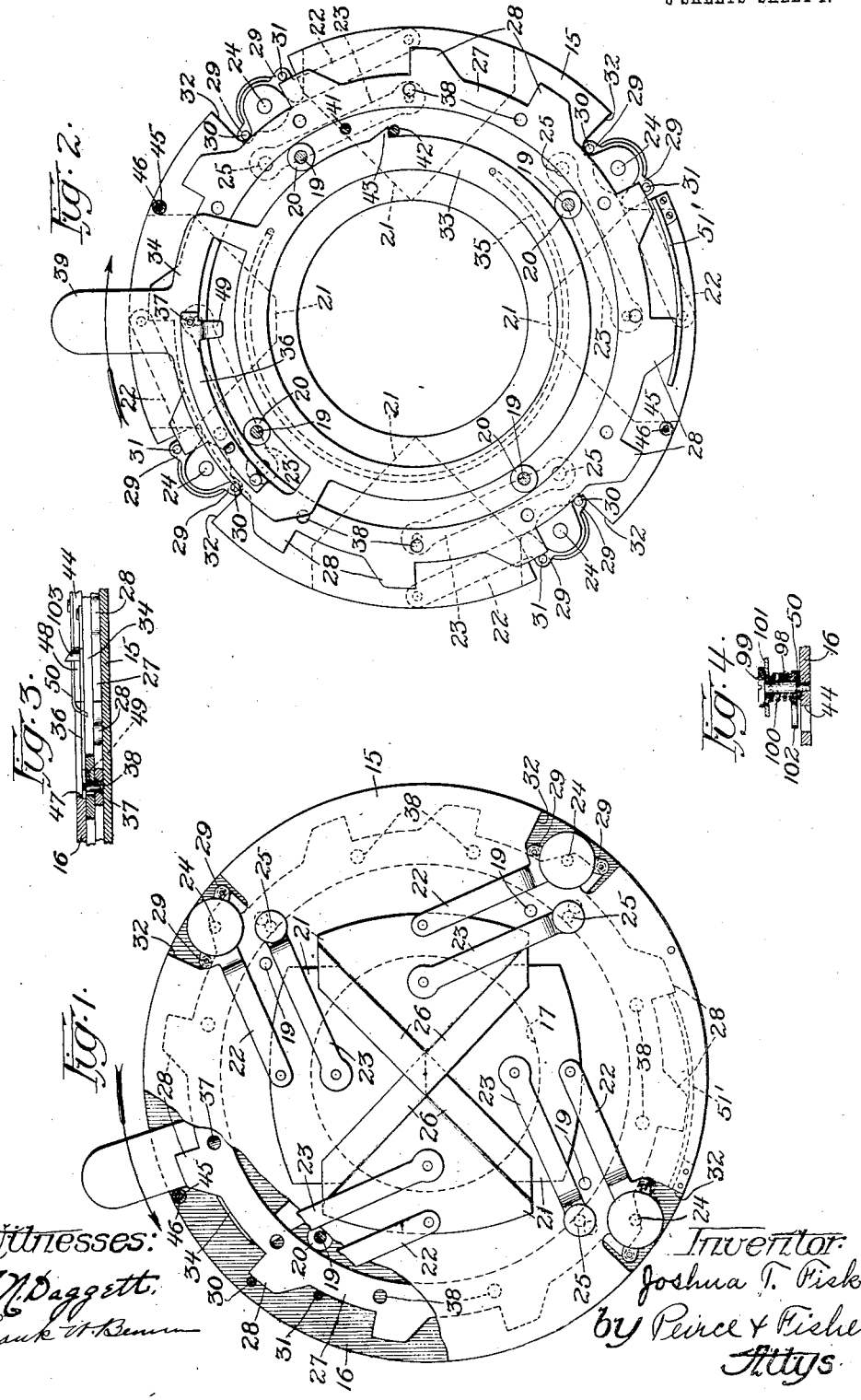

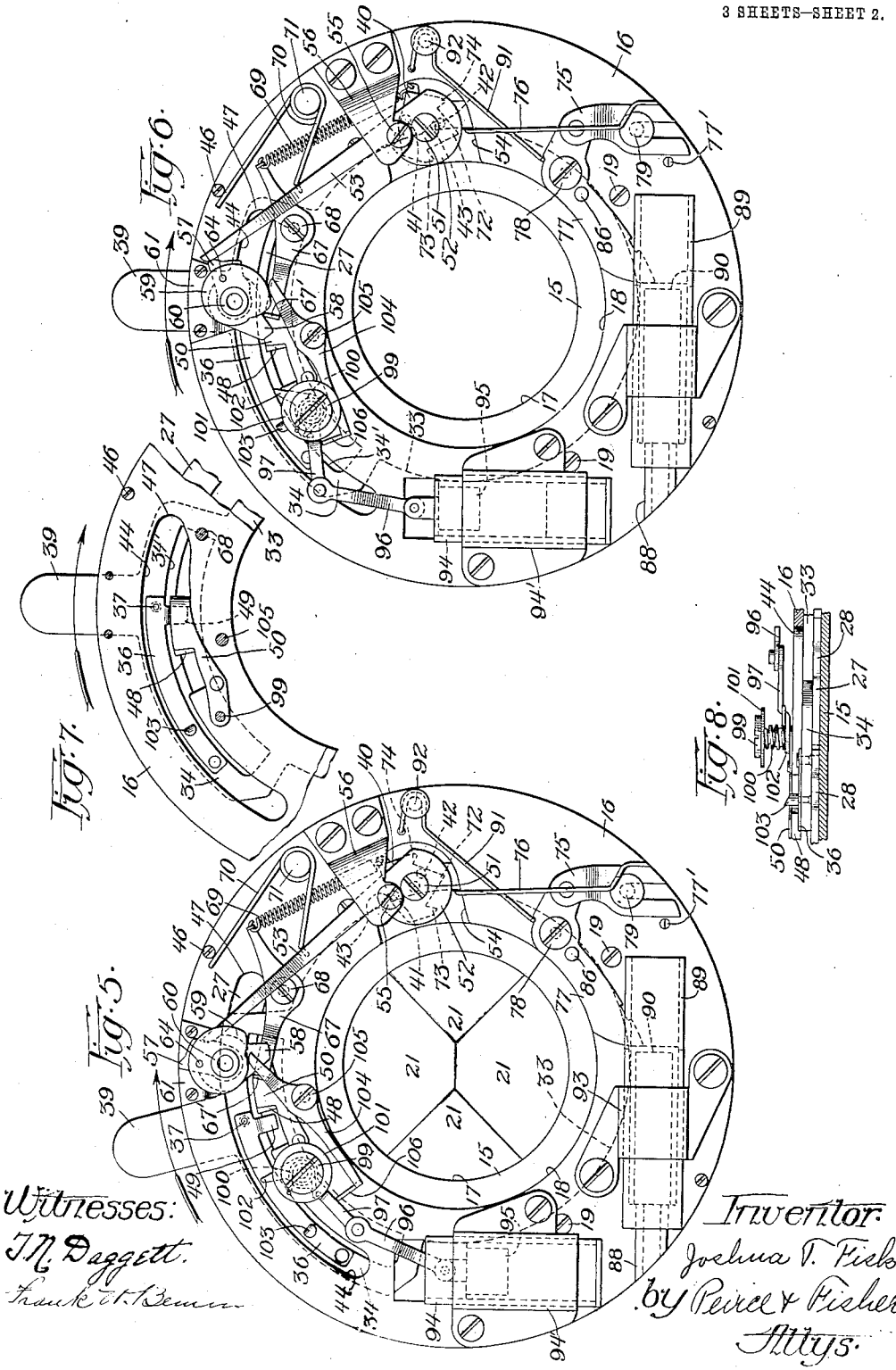

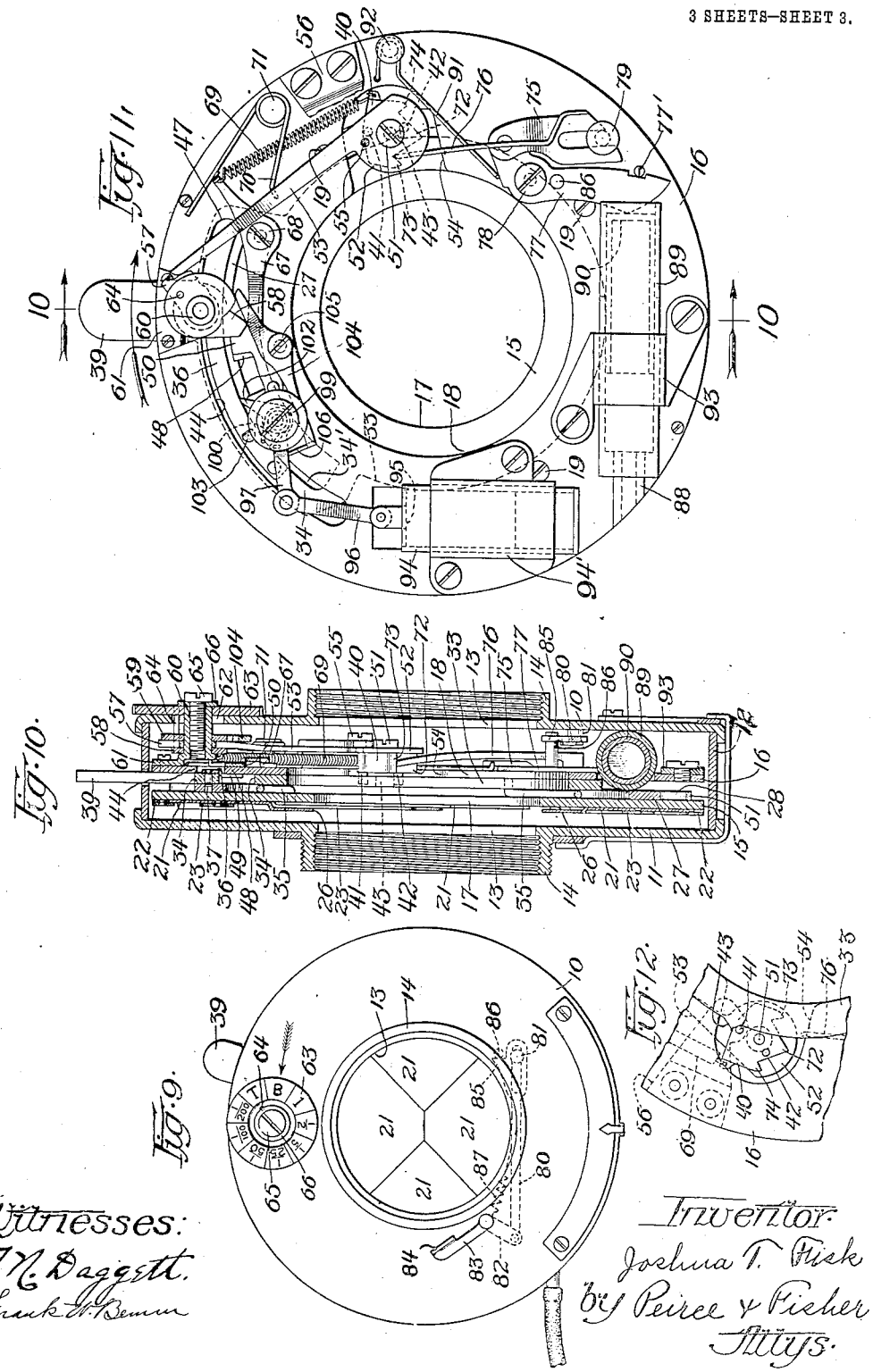

JOSHUA T. FISK, OF ROCHESTER, NEW YORK, ASSIGNOR TO CROWN OPTICAL COMPANY, OF ROCHESTER, NEW YORK, A CORPORATION.

PHOTOGRAPHIC SHUTTER.

973,021. Specification of Letters Patent. Patented Oct. 18, 1910.

Application filed November 8, 1909. Serial No. 526,862.

*To all whom it may concern:*

Be it known that I, JOSHUA T. FISK, a citizen of the United States, and a resident of Rochester, county of Monroe, and State of New York, have invented certain new and useful Improvements in Photographic Shutters, of which the following is a specification.

The invention relates to photographic shutters and seeks to provide an improved arrangement of shutter blades which can be operated at high speed and which are arranged to increase the portion of the lens aperture exposed both at the initial opening of the blades and after a given movement thereof.

Further objects of the invention are to improve and simplify the shutter operating means and the controlling devices therefor by which "time", "bulb" and instantaneous exposures are effected.

The invention consists in the features of improvement hereinafter set forth and more particularly pointed out in the appended claims.

In the drawings, which illustrate the preferred form of the invention, Figure 1 is a rear view of the improved shutter with a portion of the back supporting plate broken away. Fig. 2 is a front view of the back supporting plate and parts mounted thereon. Fig. 3 is a detail view of a portion of the operating mechanism for the shutter blades. Fig. 4 is a detail view of parts of the retarding device with portions shown in section. Fig. 5 is a view in front elevation of the improved shutter with the timing device set for "instantaneous" exposure and the driving means for the shutter blades shown in "set" position. Fig. 6 is a similar view with the timing device set for a "time" exposure and the driving means and shutter blades shown in "open" position. Fig. 7 is a detail view of a portion of the driving means for the shutter blades. Fig. 8 is a detail view of parts of the retarding means for the driving mechanism. Fig. 9 is a view in elevation of the inclosing casing for the improved shutter. Fig. 10 is a cross-section on the line 10—10 of Fig. 11 and showing the shutter inclosed in its casing. Fig. 11 is a view similar to Figs. 5 and 6 with the timing device set for a "bulb" exposure and the driving means for the shutter blades shown in "open" position. Fig. 12 is a rear face view of a part of the driving member and controlling verge or catch in the position shown in Fig. 5.

The improved shutter is inclosed as usual in a suitable casing of circular outline (see Figs. 9 and 10). The casing comprises front and back plates 10 and 11 and an intermediate peripheral wall 12. The front and back plates 10 and 11 are provided with apertures 13 having threaded flanges 14 within which the lens supporting rings are mounted. The shutter mechanism is mounted upon two circular plates or disks 15 and 16 which, for convenience, may be termed the front and back supporting plates. These supporting plates are provided with apertures 17 and 18 and are connected together by a circular series of studs 19 which extend through the plates intermediate their inner and outer edges and which are provided with spacing sleeves 20 that hold the plates apart in parallel relation. The plates 15 and 16 are also connected at diametrically opposite points and near their edges by studs 46 having spacing sleeves 45 mounted thereon between the plates.

Three or more shutter blades 21 (preferably four in number as shown) are mounted upon the rear face of the back plate 15 and are arranged in circular series about the aperture 17 therein. The blades are shiftable radially from and to the center of the aperture to open and close the same and, for this purpose, each blade is mounted upon a pair of parallel arms 22 and 23 which are pivoted to the outer, central portion of the blade. The opposite ends of the arms are connected to the plate 15 by pivot studs 24 and 25. The blades are provided with pointed inner ends and are all mounted in the same plane upon the face of the plate 15. Two diametrically opposite blades have blunt, inner ends which abut in the closed position thereof and the other two blades are provided with raised inner edge portions 26 that overlap the edges of the adjacent blades in the closed position, as illustrated in Fig. 1.

The blades are shifted by an actuator ring 27 which is mounted upon the front face of the plate 15 (see Figs. 1, 2 and 10). This ring extends around the circular series of studs 19 and its inner edge engages the spacing sleeves 20 thereon, as shown in Fig. 2, so that the ring is rotatably held in position. At its outer edge, the actuator ring 27 is provided with a series of beveled or cam teeth 28 which are preferably spaced apart and are provided with inclined cam edges and with blunt or flat outer ends. Each arm 22 is provided with a pair of ears 29 on opposite sides of its pivot pin 24 and lugs 30 and 31 project laterally from these ears through cut-away spaces or slots 32 in the plate 15 and engage the outer toothed edge of the ring 27. In the closed position of the shutter blades, the pins or lugs 30 engage the outer ends of the teeth 28 of the actuator ring while the lugs 31 engage the outer edge of the ring between the teeth thereof. This normal position of the parts is shown in Fig. 1. By shifting the actuator ring in the direction indicated by the arrows in Figs. 1 and 2 through a space equal to one-half the distance between its teeth, the teeth 28 pass from beneath the lugs 30 and the beveled edges thereof engage the lugs 31 to thereby shift the parallel arms 22 and 23 and move the blades bodily in radial direction from the center of the aperture to open the same. The lugs 31 then rest upon the outer ends of the teeth 28 and the lugs 30 upon the edge of the ring between the teeth. This position of the parts is shown in Fig. 2. A further shift in the same direction of the ring to a distance equal to one-half the space between teeth, restores the shutter blades to closed position by the action of the beveled edges of the teeth upon the lugs 30. The blades are thus shifted from the center of the lens aperture to open and close the same by the step-by-step movement of the actuator ring 27 in the same direction and it is not necessary, in order to close the blades, to reverse the direction of the movement of the actuating member after it is moved forward half a step to open the blades. By shifting the actuator ring through a whole step, the blades will be quickly opened and closed to effect "instantaneous" exposures. By arresting the movement of the actuating member or ring, midway between the ends of a full step, "time" and "bulb" exposures may be effected. With the preferred arrangement shown, where the actuator ring operates upon the blades through the medium of pairs of parallel arms, the blades are bodily shifted in radial direction from and to the center of the lens aperture and the inner edges of the blades are always maintained in substantially parallel relation. By reason of this arrangement, as soon as any portion of the lens aperture is exposed, a series of divergent, radial slits extending to the periphery of the aperture are opened and all portions of the sensitive plate or film are flooded with light. With four pointed or bevel-ended blades, as in the preferred form shown, four of these radial slits are opened as soon as the center of the lens is uncovered, and they are arranged at an angle of forty-five degrees to the horizontal and vertical, so that the light passes therethrough to all four corners of the plate or film. With this arrangement, it is possible to obtain good results at higher speeds than if the blades were pivoted or otherwise mounted. The blades are held stationary either in open or closed positions during the greater part of the movement of the ring 27 by the engagement of the flat inner ends of the teeth 28 and the edge of the ring 27 with the lugs 30 and 31 and are only moved when the beveled or cam edges of the teeth engage the lugs. The blades are thus shifted at high speed.

The actuator ring 27 is shifted step by step to open and close the shutter blades by means of a spring-actuated driving member that is preferably in the form of a ring 33 (see Figs. 2 and 10) which is arranged between the plates 15 and 16 and within the circular series of studs 19 with the outer edge of the ring engaging the spacing sleeves 20, so that the ring is rotatably sustained thereby. A circular driving spring 35 extends around the aperture, is arranged between the plate 15 and the ring 33 and is connected at its ends to the plate and ring. At one portion, the drive ring 33 is provided with a segmental projection 34 which overlaps the toothed actuator ring 27 and is provided with a segmental slot 34' through which one of the spacing sleeves 20 and one of the studs 19 extend. A curved spring pawl 36 is fixed at one end to the segmental projection 34, and at its free end is provided with a pin or stud 37 (see Fig. 3) which extends through an opening in the segmental projection 34 and is arranged to engage any one of a circular series of openings 38 formed in the actuating ring 27 and extending therethrough from one side face to the other. The driving member or ring is actuated by means of the spring 35 from its "set" position shown in Fig. 5, past its "open" position shown in Figs. 2, 6 and 11, to its closed position shown in Fig. 1, and during this shift, the spring-pawl 36 drives the actuating ring 27 through a full step to open and close the shutters. The direction of this movement is indicated by the arrows in Figs. 1, 2, 5, 6, 7 and 10. The driving member and spring pawl 36 thereon are shifted in the opposite direction to "set" position against the tension of the spring 35 by means of an arm or extension 39 on the segmental part 34 of the driving member which projects radially through a suitable slot in the peripheral wall 12 of the inclosing casing, as shown most clearly in Fig. 10. The lug 37 on the spring pawl 36 is provided with a beveled lower end (see Fig. 3), so that, during this setting movement of the driving member, the pawl is lifted out of the opening 38 in the ring 27, moved idly back over the face of the ring and engages the next opening therein to again shift the actuator ring and thereby open and close the shutter blades. The driving member is held in its "set" position by means of a spring-held catch or verge 40 having a pair of pallets or lugs 41 and 42. The lug or pallet 41 thereon is arranged to engage the radial or abrupt face of a tooth 43 on the outer edge of the driving ring 33 to hold the driving member in "set" position with its spring 35 under tension. The tooth 43 is provided with a beveled face which engages the pallet or lug 41 during the setting movement of the driving member and lifts the lug so that the latter drops into engagement with the abrupt face at the end of the setting movement. The catch or verge 40 is tripped and the return movement of the driving member is controlled by suitable exposing and timing devices hereinafter set forth.

The front supporting plate 16 is provided with a segmental slot or opening 44 (see Fig. 7) which extends over the pawl 36, so that the latter may be lifted out of engagement with the actuator ring 27 during the setting movement of the driving member. The return movement of the driving member is limited by the engagement of the arm 39 thereon with a spacing sleeve 45 on a stud 46 that extends between the plates 15 and 16. At the end of this return movement of the driving member, the free end of the spring-pawl 36 engages the portion 47 of the plate 16 and the end of the slot 44 therein, as shown in Fig. 3, and this edge portion is undercut slightly, so that the lug 37 of the pawl is locked into engagement with the actuator ring 27 and there can be no overthrow of the latter or accidental movement thereof independent of the pawl. This edge portion, however, does not prevent the disengagement of the pawl 36 from the actuator ring upon the setting movement of the driving member, since the pawl is then not only lifted but is moved back away from the edge portion 47.

In the open position of the shutter blades, the pawl 36 is also locked into engagement with the actuator ring 27 to prevent the overthrow or accidental displacement thereof by a lug 48 on the inner edge of the opening 44 of the plate 16 which overlaps an inwardly projecting lug 49 on the pawl (see Figs. 2, 3 and 7). During the setting movement of the driving member, the lug 49 on the pawl is lifted over the lug 48 by a spring finger 50 which is secured to the plate 16 and which overlaps the lug 48 and is provided with a depending end portion (see Fig. 3). During the setting movement of the operating member, the depending end portion of the spring finger 50 engages the lug 49 on the pawl 36 and lifts it over the lug 48. On the return movement, however, of the driving member, the lug 49 on the pawl passes below the lug 48 on the plate 16 and the pawl is thereby locked in engagement with the toothed actuating ring 27. During this return movement the lug 49 passes beneath and lifts the downturned end of the spring finger 50. The return movement of the driving member is arrested in its normal or "closed" position when the shutter is set for "instantaneous" exposures and is arrested both in its "open" and in its "closed" positions when the shutter is set for "time" or "bulb" exposures. When it is so arrested, however, it is locked, as above described, to the actuator ring 27, so that there can be no overthrow of the ring and the actuator ring and driving member are always maintained in proper operative relation.

The actuator ring 27 is always driven in the same direction and its return movement is prevented by a spring retaining pawl 51' (see Figs. 1 and 2) which is arranged to engage the radial or abrupt faces of the teeth 28 of the ring. During both the opening and closing movements of the shutter blades, the actuator ring and the driving member move in one direction only, so that the blades can be opened and closed at high speed, since it is not necessary, after the shutter blades have been opened, to arrest the momentum of the operating parts and reverse their direction of movement to close the blades.

The catch or verge 40 having the pallets or lugs 41 and 42 thereon, is connected by a pivot screw or stud 51 to the enlarged end portion 52 of a supporting arm 53, the pallets or lugs 42 being arranged on opposite sides of the verge pivot 51. The verge or catch is arranged within a cut-away space 54 in the plate 16, so that the pallets or lugs 41 and 42 can engage the tooth 43 upon the edge of the drive ring 33. The supporting arm 53 is connected by a pivot stud or screw 55 to the end of an overhanging bracket 56 which is secured to the face of the plate 16. The pivot 55 of the supporting arm 53 is substantially in line with the working or operative face or edge of the pallet or lug 41, so that the movement of the supporting arm, while it shifts the verge 40 and its pivot 51, will not materially change the relation of the pallet or lug 41 to the tooth 43 on the driving member. The shift of the arm 53 will, however, move the pallet or lug 42 of the verge to thereby vary the operation of this pallet or lug upon the driving member to effect the different exposures as hereinafter set forth.

The supporting arm 53 is shifted by a suitable timing device which, in the preferred form, comprises three cams 57, 58 and 59 which are rotatably mounted upon the hollow, projecting stud 60 of a bracket 61 that is secured to the upper edge portion of the plate 16. This stud 60 extends through an opening 62 in the front plate 10 of the casing (see Fig. 10) and a setting disk 63 is rotatably mounted upon the outer end of the stud. The cams 57, 58 and 59 are connected together and to the setting disk 63 by an eccentric pin 64 which extends through the cam and disk and through the opening 62 which, as shown in Fig. 10, is considerably larger than the stud 60. A screw 65 threaded into the stud 60 is provided with a washer 66 which overlaps the setting disk 63 and holds the latter with some friction against the face of the front plate 10 of the casing, so that the timing device is held in adjusted position. The cams of the timing device rotate together and could be formed of one piece of metal but, for convenience of manufacture, are separately formed and are connected to rotate together and with the disk 63 by the pin 64 as described.

The end of the supporting arm 53 for the verge or catch 40 engages the intermediate cam 57 of the timing device. The inner cam 58 engages a lug 67' on one end of a lever 67. This lever is connected between its ends to the plate 16 by a pivot pin 68. The opposite end of the arm is connected to one end of a spring 69 and the other end of this spring is connected to the verge or catch 40 and tends to hold the pallet or lug 41 thereon in engagement with the edge of the driving ring 33. This spring also tends to hold the arm 67 in position with the lug 66 thereon held against the cam 58 of the timing device. A spring 70, mounted on a stud 71 on the face of the plate 16, has one end in engagement with the supporting arm 53 and its opposite end in engagement with the head of one of the studs 46, so that the spring is arranged to hold the supporting arm in engagement with the intermediate cam 57 of the timing device.

The verge or catch 40 is provided on one side with a pointed tooth 72 and with abutments or shoulders 73 and 74 on opposite sides of the tooth. An exposing trip 75 is provided with a spring finger 76 which is arranged to engage the shoulder 73 of the verge to oscillate the same in one direction and thereby move the pallet or lug 41 out of engagement with the tooth 43 and move the pallet or lug 42 toward the driving ring and, when the shutter is set for "time" or "bulb" exposures, into the path of movement of the tooth 43. The spring finger 76 of the exposing trip is also arranged to engage the shoulder 74 to oscillate the verge in the opposite direction to move the pallet or lug 42 out of engagement with the tooth 43 when the shutter is set for "time" exposures.

The exposing trip 75 is pivoted to the short arm of a lever 77 which is pivotally connected to the plate 16 by a stud or screw 78. The opposite end of the trip is provided with a slot engaging the shank of a headed guide stud 79 on the face of the plate 16. By shifting the lever 77, the trip 75 and spring finger 76 thereon are moved in substantially a straight line into engagement with the verge or catch 40 to oscillate the same. The movement of the lever 77 is limited, as shown in Fig. 11, by its engagement with a stop pin 77' fixed to the face of the plate 16.

A shifter rod 80 is mounted upon the rear face of the front plate 10 of the inclosing casing (see Figs. 9 and 10). At one end, the rod is provided with a longitudinal slot engaged by a stud 81 on the plate 10 and, at its other end it is connected to the inner arm 82 of a bell crank lever journaled in the plate 10. The outer arm 83 of the bell crank is arranged exteriorly of the casing and is provided with a finger piece 84. The end of the shifter rod is provided with a lug or tooth 85 which is arranged to engage a pin 86 on the lever 77. A retractile spring 87 is connected to the rod 81 and to the pivot of the bell crank lever 82—83.

The trip 75 and finger 76 can be shifted to move the catch or verge 40 by means of the bell crank 83 and the connections described between this bell crank and the lever 77 or by means of the usual air bulb, the tube of which can be connected by a suitable nipple to a pipe 88. This pipe opens through the peripheral wall 12 of the inclosing casing and leads to an air cylinder 89. The end of the lever 77 extends through a slot in the opposite end of the cylinder 89 and is arranged to be engaged by a piston 90 in the cylinder. The exposing lever 77 is provided with a return spring 91 which engages a stud 92 on the face of the plate 16. One end of the spring engages an opening in the plate and the opposite end extends into engagement with the lever.

In Fig. 5, the driving member is shown as held in set position by the engagement of the pallet or lug 41 of the verge 40 with the tooth 43 on the driving ring 33. In this figure, the timing device is shown in position for effecting "instantaneous" exposures. In this position, the end of the supporting arm 53 of the verge is in engagement with the low portion of the cam 57. This holds the verge 40 in such position that the pallet or lug 42 thereon is some distance from the edge of the driving ring 33. In this position, the pallet or lug 42 will not be moved into the path of movement of the tooth 43 when the trip finger 76 is moved against the shoulder 73 to oscillate the verge and move the pallet or lug 41 out of engagement with the tooth 43. The driving member is thus free to move through a full step and open and close the shutter blades.

When the timing mechanism is set for "time" exposures, the end of the supporting arm 53 is upon the high point of the cam 57, as shown in Fig. 6, so that the pallet or lug 42 thereof is near the driving ring 33. Under such circumstances, the first operation of the trip will bring the spring finger into engagement with the shoulder 73 of the verge and oscillate it in one direction to move the lug 41 out of engagement with the tooth 43 of the driving member and move the lug 42 into the path of movement of the tooth, so that the driving member and actuating ring 27 move through a half step only to open the shutter blades. The oscillating verge or catch 40 is then in the position shown in Fig. 6 so that, at the second operation of the exposing trip, the spring finger 76 will engage the opposite face of the tooth 72 of the verge and will be directed thereby into engagement with the shoulder 74 to oscillate the verge in the opposite direction and move the pallet or lug 42 out of engagement with the tooth 43 to thereby permit the completion of the movement of the driving member and actuating ring and the closing of the shutter blades.

When the shutter is set for "bulb" exposures, the end of the supporting arm 53 is upon an intermediate point of the cam 57, as shown in Fig. 11. The verge is then in such a position that the operation of the trip finger 76 against the shoulder 73 of the verge will disengage the lug 41 from the tooth 43 and will bring the lug 42 thereof partially into the path of movement of the tooth and sufficient to arrest the movement of the driving member in its "open" position as shown in Fig. 11. The engagement of the lug 42 in this position of the parts is not complete and the driving member will be released and will complete this movement as soon as the pressure of the trip finger 76 upon the shoulder 73 is released, and when this occurs the shutter blades close.

To insure the prompt disengagement of the lug 42 of the verge from the tooth 43 when the pressure of the trip on the verge is released, the cam 58 of the timing device is arranged to shift the lever 67 and place the spring 69 of the verge under considerable tension, when the timing device is set for "bulb" exposures. In this adjustment, the lug 66 on the lever 67 is on the high point of the cam 58, as shown in Fig. 11. At other times, the lug 66 rests on the low part of the cam 58 and there is then only sufficient tension on the spring 59 to hold the lug 41 in position to engage the tooth 43 of the driving member to thereby hold the latter in its "set" position.

In the form shown, the air cylinder 89 is arranged in horizontal position at the lower part of the shutter being secured to the plate 16 by a suitable U-clamp 93. On one side of the plate 16 is arranged a vertical dash-pot cylinder 94 which is secured thereto by a suitable clamp 94'. A piston 95 within this cylinder is connected by a link 96 to an arm 97. This arm is provided with a sleeve 98 (see Fig. 4) that engages the lower part of the enlarged portion of a shouldered stud 99 which is threaded into the plate 16. A light spring 100 coiled about the sleeve 98 is fixed at one end to the arm 97 and at its upper end to a washer 101 mounted on the stud 99 below its upper headed end. The arm 97 is provided adjacent its pivot with a projecting part 102 which is arranged to contact with a pin 103 on the segmental portion 34 of the driving member. The contacting stud 103 is provided with a beveled face (see Fig. 8) so arranged that, on the setting movement of the driving member, it will engage the projection 102 of the arm 97 and lift it out of its path without swinging the arm 97 on its pivot or moving the dash-pot. When the arm 97 is thus lifted, it rises on the stud 99 but as soon as the pin 103 is past the projection 102, the spring 98 will restore the arm 97 to its normal position. Then, on the return or operating movement of the driving member, the straight face of the pin or lug 103 will strike the projection 102 and swing the arm 97 upon the pivot pin 99 against the resistance afforded by the dash-pot and by the spring 101. The return or operating movement of the driving member is thereby retarded. The driving member cannot complete its movement until it has moved the projection 102 on the arm 97 out of the path of the pin 103 and by varying the extent to which the part 102 extends into the path of movement of the pin 103, the retarding effect can be varied. For this purpose, an adjusting lever 104 is pivoted intermediate its ends by a screw 105 and one end of the lever is arranged to engage the cam 59 of the timing device. The pivot 105 on the lever 104 is on one side of the pivot 99 of the arm 97 and the end of the lever on the opposite side of the pivot 99 is provided with a projection 106 which is in one-way engagement with the arm 97. By shifting the timing device, the position of the arm 97 and dash-pot can be adjusted to vary the extent to which the projection 102 extends into the path of movement of the pin 103. Whenever the timing device is set for "bulb", "time" or instantaneous exposures of highest speed, the lever 104 holds the arm 97 in position with the projection 102 thereof entirely out of the path of movement of the pin or stud 103, as shown in Figs. 6 and 11. In all other positions of the timing device, the arm 97 is so held by the lever 104 that the projection 102 thereon project to a greater or less extent into the path of movement of the pin 103 of the driving member and the return movement of the latter is variably retarded as described and operates the shutter blades at different speeds.

Both the dash-pot and the spring 100 act on the arm 97 to retard the operating movement of the driving member. The washer 101 to which one end of the spring 100 is connected, engages the upper portion and head of the stud 99 with considerable friction, so that by rotating the washer, the tension of the spring 100 can be nicely adjusted and the retarding device can be arranged to operate with great accuracy to properly control the speed of operation of the shutter blades.

It is obvious that numerous changes can be made in the details set forth without departure from the essentials of the invention as defined in the claims and that parts of the invention may be used without adopting the same in entirety.

I claim as my invention:—

1. In a photographic shutter, the combination with a support having an aperture therein, of a circular series of blades having pointed inner ends arranged to overlap in closed position, and a number of pairs of parallel arms pivoted at their outer ends to said support, the inner ends of the arms of each pair being pivoted to one of said blades, whereby said blades are bodily shiftable in radial direction from and to the center of the aperture to open and close the same with the adjacent edges of the pointed end portions of said blades maintained in parallel relation, substantially as described.

2. In a photographic shutter, the combination with a support having an aperture therein, of a circular series of blades having pointed inner ends arranged to overlap in normal position to close said aperture, a number of pairs of parallel arms pivoted to said support and to said blades, and means for oscillating said arms to shift said blades radially from and to the center of said aperture to open and close the same, substantially as described.

3. In a photographic shutter, the combination with a support having an aperture therein, of a circular series of blades having pointed inner ends arranged to overlap in normal position to close said aperture, a number of pairs of parallel arms pivoted to said support and to said blades, and an actuator arranged to engage one of the arms of each pair to oscillate the same to shift said blades, substantially as described.

4. In a photographic shutter, the combination with a support having an aperture therein, of a circular series of blades having pointed inner ends arranged to overlap in normal position to close said aperture, a number of pairs of parallel arms pivoted to said support and to said blades, an actuator ring mounted on said support about said aperture and arranged to oscillate said parallel arms to shift said blades, and means for driving said ring step-by-step in one direction, substantially as described.

5. In a photographic shutter, the combination with a support having an aperture therein, of a circular series of blades having pointed inner ends arranged to overlap in normal position to close said aperture, a number of pairs of parallel arms pivoted to said support and to said blades, a toothed actuator ring, one of the arms of each pair having lugs engaging the teeth of said ring, and a spring actuated driver for shifting said ring step-by-step in one direction, substantially as described.

6. In a photographic shutter, the combination with a support having an aperture therein of a circular series of blades arranged in the same plane and having pointed inner ends, certain of said blades having deflected inner edges arranged to overlap the edges of adjacent blades in closed position, and means for shifting said blades from and to the center of said aperture to open and close the same, substantially as described.

7. In a photographic shutter, the combination with a supporting plate having an aperture therein, of a circular series of blades having pointed inner ends mounted in the same plane on the face of said plate, certain of said blades having deflected inner edges arranged to overlap the edges of adjacent blades in closed position, and means for reciprocating said blades in radial direction to open and close said aperture, substantially as described.

8. In a photographic shutter, the combination with a supporting plate having an aperture therein, of a series of blades mounted on one side face of said plate, a series of arms pivoted on the same side of said plate and engaging said blades, a toothed actuator ring mounted on the opposite side face of said plate about said aperture, each of said arms having a pair of laterally projecting lugs engaging the teeth of said actuator ring, and a spring-actuated driver for operating said ring, substantially as described.

9. In a photographic shutter, the combination with a supporting plate having an aperture therein, of a series of blades mounted on one side face of said plate, a series of arms pivoted on the same side of said plate and engaging said blades, a toothed actuator ring mounted on the opposite side face of said plate, about said aperture, each of said arms having a pair of laterally projecting lugs engaging the teeth of said actuator ring, a spring-actuated oscillating drive ring mounted on said plate within said actuator ring, and a pawl on said drive ring arranged to engage said actuator ring and advance the same step-by-step in one direction, substantially as described.

10. In a photographic shutter, the combination with a supporting plate having an aperture therein, of a series of blades mounted on one side face of said plate, a series of arms pivoted on said plate and engaging said blades, a toothed actuator ring mounted on the opposite side face of said plate about said aperture, each of said arms having a pair of laterally projecting lugs engaging the teeth of said actuator ring, a spring-actuated, oscillating drive ring mounted on said plate within said actuator ring, said drive ring having a portion overlapping said actuator ring, and a spring pawl on said overlapping portion arranged to engage openings in the side of said toothed ring to advance the same step-by-step, substantially as described.

11. In a photographic shutter, the combination with a suitable support having an aperture therein, of a series of blades, an actuator ring for operating said blades to open and close said aperture, a spring-actuated arm, and a spring pawl on said arm arranged to engage openings in the side face of said ring to drive the same step-by-step in one direction, substantially as described.

12. In a photographic shutter, the combination with a suitable support having an aperture therein, of a series of blades, an actuator ring for operating said blades to open and close said aperture, a spring-actuated arm, a spring-pawl on said arm arranged to engage openings in the side face of said ring to drive the same step-by-step in one direction, and means for locking said pawl in engagement with said ring in the "open" and "closed" positions of said driving arm, substantially as described.

13. In a photographic shutter, the combination with a suitable support having an aperture therein, of a series of blades, an actuator ring for operating said blades to open and close said aperture, a spring-actuated arm, a spring-pawl on said arm arranged to engage openings in the side face of said ring to drive the same step-by-step in one direction, means for releasably holding said arm in "set" position, a lug for locking said pawl in engagement with said ring in the "open" position of said arm, and means for lifting said pawl over said lug as the arm is shifted to its "set" position, substantially as described.

14. In a photographic shutter, the combination with a suitable support having an aperture therein, of a series of blades, a series of shifter arms for said blades, a toothed actuator extending about said aperture, said arms having lugs engaging the toothed edge of said ring, a spring actuated driving arm, a spring pawl on said arm arranged to engage openings in the side face of said ring to drive the same step-by-step in one direction, and means for locking said pawl to said ring in the "open" and "closed" positions of said arm, substantially as described.

15. In a photographic shutter, the combination of two supporting plates having apertures therein, a circular series of studs having spacing sleeves therein connecting said plates and holding the same spaced apart in parallel relation, a toothed actuator ring arranged about and engaging said spacing sleeves, a spring actuated, oscillating drive ring arranged within and engaging said sleeves, a pawl on said drive ring for shifting said toothed ring step-by-step in one direction, a series of blades mounted on the face of one of said plates, and a series of pivoted shifter arms for opening and closing said blades each having a pair of lugs on opposite sides of its pivoted arms engaging the teeth of said actuator ring, substantially as described.

16. In a photographic shutter, the combination with a suitable support having an aperture therein, of an actuator ring arranged about said aperture and provided on its edge with a series of teeth spaced apart and having flat outer ends, a series of pivoted blade shifters each having a pair of lugs on opposite sides of its pivot engaging the toothed edge of said ring, and means for driving said ring, substantially as described.

17. In a photographic shutter, the combination with a spring-actuated driving member, of a verge having two pallets or lugs coöperating with said member to hold the same in its "set" and "open" positions, an exposing trip arranged to engage and oscillate said verge, and a timing device independent of said trip for adjusting said verge to vary its operation, substantially as described.

18. In a photographic shutter, the combination with a spring-actuated driving member, of a pivoted verge having two pallets or lugs coöperating with said driving member to hold the same in its "set" and "open" positions, a timing device for adjusting the pivot of said verge to vary its operation, and an exposing trip for oscillating the same, substantially as described.

19. In a photographic shutter, the combination with a spring-actuated driving member, of a pivoted spring-held verge having two pallets or lugs, one for holding said driving member in "set" position and the other for holding the same in its "open" position, an exposing trip arranged to engage and oscillate said verge to throw the lugs thereof in opposite directions, and a timing device independent of said trip for varying the position and operation of said second pallet or lug, substantially as described.

20. In a photographic shutter, the combination with a spring-actuated driving member, of a pivoted spring-held verge having two pallets or lugs, one for holding said driving member in "set" position and the other for holding the same in its "open" position, said verge having a beveled tooth with shoulders on opposite sides thereof, an exposing trip having a spring finger arranged to engage said shoulders to oscillate said verge in opposite directions, and a timing device for shifting the pivot of said verge to vary its operation, substantially as described.

21. In a photographic shutter, the combination with a spring-actuated driving member, of a spring-held verge having two pallets or lugs, one for holding said driving member in "set" position and the other for holding the same in "open" position, a pivoted support whereon said verge is eccentrically pivoted, a timing device for shifting said support, and an exposing trip for oscillating said verge, substantially as described.

22. In a photographic shutter, the combination with a spring-actuated driving member, of a spring-held verge having two pallets or lugs, one for holding said driving member in "set" position and the other for holding the same in "open" position, a pivoted supporting arm whereon said verge is eccentrically pivoted, the pivot of said arm being substantially in line with the working face of said first pallet or lug, a timing device for shifting said arm, and an exposing trip arranged to oscillate said verge in opposite directions, substantially as described.

23. In a photographic shutter, the combination with a spring-actuated driving member, of a spring-held verge having two pallets or lugs, one for holding said driving member in "set" position and the other for holding the same in "open" position, a pivoted support whereon said verge is eccentrically pivoted, an exposing trip for oscillating said verge, and a timing device arranged to shift said support and to place the spring of said verge under tension in "bulb" position, substantially as described.

24. In a photographic shutter, the combination with a spring actuated driving member, of a pivoted support, a verge eccentrically pivoted on said arm and having two pallets or lugs on opposite sides of its pivot, one arranged adjacent the pivot of said support for holding said member in "set" position and the other arranged to hold said member in its "open" position, a timing device for shifting said support to vary the position and operation of the second pallet or lug, and an exposing trip for oscillating said verge in opposite directions, substantially as described.

25. In a photographic shutter, the combination with a suitable support having an aperture therein, of blades for opening and closing said aperture, a spring-actuated driving lever for said blades having a tooth, a spring-held verge having a pair of pallets coöperating with said tooth to hold said lever in its "set" and "open" positions, a pivoted support whereon said verge is eccentrically pivoted, a timing cam for shifting said support, and an exposing trip having a spring-finger for shifting the same in opposite directions, substantially as described.

26. In a photographic shutter, the combination with a suitable support having an aperture therein, of blades for opening and closing said aperture, a spring-actuated driving lever for said blades having a tooth, a spring-held verge having a pair of pallets coöperating with said tooth to hold said lever in its "set" and "open" positions, a pivoted arm whereon said verge is eccentrically pivoted with the working face of the first pallet substantially in line with the pivot of said arm, a timing cam for shifting said arm, and an exposing trip for oscillating said verge, substantially as described.

27. In a photographic shutter, the combination with a support having an aperture therein, and blades for opening and closing said aperture, of a spring-actuated driving lever for said blades having a tooth, a verge having a pair of pallets coöperating with said tooth to hold said lever in its "set" and "open" positions, a pivoted arm whereon said verge is eccentrically pivoted, a spring connected to said verge, a pivoted lever connected to said spring, a timing device having cams for shifting said arm and said lever, and an exposing trip for oscillating said verge, substantially as described.

28. In a photographic shutter, the combination with a spring-actuated, driving member, of a retarding device therefor, said driving member and retarding device having contacting lugs, one of which is arranged to yield and pass by the other on the setting movement of said driving member, an adjusting lever for shifting said retarding device and holding the same in adjusted position and a timing cam for shifting said lever, substantially as described.

29. In a photographic shutter, the combination with a spring-actuated driving member, of a retarding device comprising a dashpot, a pivoted arm connected thereto, a pivoted adjusting lever engaging said arm, and a timing cam for shifting said adjusting lever, substantially as described.

30. In a photographic shutter, the combination with a spring actuated driving member, of a retarding device comprising a dash-pot, a pivoted arm connected thereto, a setting lever pivoted on one side of the pivot of said arm and engaging the same on the opposite side thereof, said arm and said driving member having contacting parts arranged to yield on the setting movement of said member, substantially as described.

31. In a photographic shutter, the combination with a spring-actuated driving member, of a retarding dash-pot therefor, means for variably setting said dash-pot, a pivoted arm connected to said dash-pot, a spring coiled about the pivot of said arm and acting to restore said dash-pot to normal position, and an adjustable friction washer on the pivot of said arm to which one end of said spring is connected.

32. In a photographic shutter, the combination with a spring-actuated driving member, of a retarding device therefor comprising a dash-pot, an arm connected to said dash-pot, means acting on said arm for variably adjusting said dash-pot, a spring acting on said arm and means for adjusting the tension of said spring, substantially as described.

33. In a photographic shutter, the combination with a support having an aperture therein, of a circular series of blades having pointed inner end portions, the edges of which are arranged to overlap in closed position, a number of pairs of parallel arms pivoted to said support and to said blades for shifting the same from and to the center of said aperture, and for maintaining the edges of the pointed inner ends of adjacent blades in parallel relation as the latter are shifted, and common actuating means for oscillating said arms.

34. In a photographic shutter, the combination with a series of blades, of an actuator ring therefor, a spring-actuated, reciprocating driving member, a pawl on said driving member arranged to engage said ring to drive the same step-by-step in one direction, releasable stop devices for arresting the operating movement of said arm and ring with the blades in open position, a lug for locking said pawl in engagement with said ring into "open" position of the parts, and means for lifting said pawl over said lug on the idle or backward movement of said driving member.

35. In a photographic shutter, the combination with a spring-actuated, driving member, of an oscillating verge coöperating with said member to hold the same in set and open positions, said verge having shoulders on opposite sides of its pivot, an exposing trip arranged to engage said shoulders and oscillate said verge in opposite directions, and a timing device for adjusting the position of said verge to vary its operation.

36. In a photographic shutter, the combination with a spring-actuated, driving member, of a verge having two pallets or lugs coöperating with said member to hold the same in set and open positions, an exposing trip for oscillating said verge in opposite directions, thereby to successively disengage said pallets or lugs from said member, and a timing device acting independently of said trip to adjust said verge to "time", "bulb" and "instantaneous" positions.

37. In a photographic shutter, the combination with a spring-actuated, driving member, of a pivoted verge coöperating with said driving member to hold the same in set and open positions, said verge having a beveled tooth with shoulders on opposite sides thereof, and an exposing trip having a spring finger arranged to engage said shoulders and oscillate said verge in opposite directions.

38. In a photographic shutter, the combination with a spring-actuated, driving member, of a catch for arresting the movement of said driving member in "open" position, an exposing trip for releasing said catch, a pivoted support whereon said catch is eccentrically pivoted, and a timing cam for shifting said support and said catch to its "time", "bulb" and "instantaneous" positions.

39. In a photographic shutter, the combination with a spring-actuated, driving member, of a spring-held verge coöperating with said driving member to hold the same in set and open positions, an exposing trip arranged to engage and oscillate said verge in opposite directions, and a support whereon said verge is pivoted, said support being adjustable to vary the position and operation of said verge for time, bulb and instantaneous exposures.

40. In a photographic shutter, the combination with a spring-actuated, driving member, of a spring-held verge coöperating with said driving member to hold the same in set and open positions, a pivoted support whereon said verge is eccentrically pivoted, a timing cam for adjusting said support and thereby varying the operation of said verge, and an exposing trip arranged to oscillate said verge in opposite directions.

41. In a photographic shutter, the combination with a spring-actuated, driving member, of a spring-held catch coöperating with said member to arrest the movement thereof in "open" position, an adjustable support whereon said catch is pivoted, an exposing trip for releasing said catch, and a timing device having means for shifting said support and for placing the spring of said catch under tension in "bulb" position.

42. In a photographic shutter, the combination with a support having an aperture therein, and blades for opening and closing said aperture, of a spring-actuated, driving member for shifting said blades, a spring-held, oscillating verge coöperating with said member to hold the same in set and open positions, a pivoted support whereon said verge is eccentrically pivoted, a timing cam for adjusting the position of said support and varying the operation of said verge, and an exposing trip arranged to engage said verge and positively shift the same in opposite directions.

43. In a photographic shutter, the combination with the shutter blades, and a spring-actuated, driving member therefor, of an oscillating verge coöperating with said driving member to hold the same in set and open positions, an exposing trip arranged to engage said verge and oscillate the same in opposite directions, and an adjustable support whereon said verge is pivoted, a retarding device for said driving member, and a timing cam for adjusting the position of said support and for varying the operation of said retarding device.

JOSHUA T. FISK.

Witnesses:
H. W. HARMON,
ALBERT E. MAY.